United States Patent
De Freitas et al.

[15] 3,668,285
[45] June 6, 1972

[54] WARM-PRESSING METHOD OF MAKING STACKED FUEL PLATES

[72] Inventors: C. Trench De Freitas, Sao Paulo, Brazil; Joseph W. Handwerk, Sepulveda, Calif.

[73] Assignee: The United States of America as represented by the United States Atomic Energy Commission

[22] Filed: Oct. 27, 1970

[21] Appl. No.: 84,516

[52] U.S. Cl. .................................................. 264/0.5, 176/67
[51] Int. Cl. ....................................... G21c 21/02, G21c 3/18
[58] Field of Search .................... 264/0.5, 322; 176/90, 67

[56] References Cited

UNITED STATES PATENTS

| | | | |
|---|---|---|---|
| 3,116,137 | 12/1963 | Vasilos et al. | 264/332 |
| 2,950,238 | 8/1960 | Nicholson | 264/0.5 |
| 3,102,850 | 9/1963 | Ross et al. | 264/0.5 |
| 3,255,278 | 6/1966 | Smith | 264/0.5 |
| 3,198,856 | 8/1965 | Hammond et al. | 264/0.5 |

FOREIGN PATENTS OR APPLICATIONS

| | | | |
|---|---|---|---|
| 712,087 | 10/1961 | Canada | 264/0.5 |
| 717,434 | 9/1965 | Canada | 264/0.5 |

*Primary Examiner*—Benjamin R. Padgett
*Assistant Examiner*—Roger S. Gaither
*Attorney*—Roland A. Anderson

[57] ABSTRACT

A process for rapidly fabricating large numbers of thin, flat fuel plates of uranium dioxide or uranium dioxide-plutonium dioxide for use in a nuclear reactor. Using $U_3O_8$ or an uranium oxide having an oxygen to metal ratio greater than 2 to 1 as starting material, a plurality of such plates are pressed simultaneously in a metallic die at 800° to 1,000° C. in a reducing atmosphere using spacers between the plates.

4 Claims, No Drawings

3,668,285

WARM-PRESSING METHOD OF MAKING STACKED FUEL PLATES

CONTRACTURAL ORIGIN OF THE INVENTION

The invention described herein was made in the course of, or under, a contract with the United States Atomic Energy Commission.

CROSS-REFERENCE TO RELATED APPLICATION

This application is an improvement on application Ser. No. 726,243, filed May 2, 1968, now U.S. Pat. No. 3,576,925 issued Apr. 27, 1971, in the names of Joseph H. Handwerk, Joseph T. Dusek and George D. White now U.S. Pat. No. 3,576,925.

BACKGROUND OF THE INVENTION

A substantial effort has gone into development of techniques for the preparation of ceramic pellets for use as fuel in a nuclear reactor. Cold pressing and sintering is the technique that has been used most widely up to this time. Other techniques on which work has been done include hydrostatic pressing, slip casting, extrusion pressing, vibration compaction and swaging. While acceptable results have been attained using these techniques for preparing small, cylindrical fuel pellets for existing reactor, none of these techniques are completely satisfactory for preparing a large quantity of thin, flat ceramic plates—of the nature of ceramic tile—such as are expected to be used as fuel in the Zero Power Plutonium Reactor (ZPPR). This reactor will require thousands of plates which are square in shape, about 5 cm on a side and about 0.5 cm thick and contain mixed uranium and plutonium dioxides compressed to a density of 85–87 percent of theoretical. In particular, cold pressing and sintering is not completely satisfactory because it is difficult to obtain a pressed compact of completely uniform thickness and density. This may result in warpage of the tile. In sintering the tile some distortion is likely to be encountered due to temperature variations in the furnace and the nonuniform pressed density. In addition, it is difficult to hold the density of the sintered tile within the required limits, since a higher density is normally obtained by sintering.

Another technique that is available for fabricating ceramic compacts is hot pressing and the above-identified application discloses a practical method for hot pressing simultaneously a large number of such compacts. While the procedure disclosed in this application is perfectly practical and results in satisfactory ceramic compacts, high temperatures are required which entail the use of a graphite die which in turn requires that a relatively low die pressure be employed. To overcome the low die pressure, it is necessary that the pressing times be extended considerably in order to obtain the required compact densities. For example, the material to be pressed would have to remain in the die for at least 45 minutes and perhaps several hours, depending upon the pressures and temperatures and starting material used, in order to produce satisfactory fuel plates of sufficient density. If the temperature could be reduced to no greater than 1,100° C., metal dies could be used which would permit the utilization of higher die pressures and preparation of the plates would be much faster because residence times of the material in the dies could be substantially reduced. If the procedure of the above application be followed employing these lower temperatures, satisfactory results are not attained since the final density of the compacts is too low.

It is accordingly the object of the present invention to develop a method of rapidly fabricating a plurality of ceramic compacts simultaneously.

It is also the object of this invention to develop a method of rapidly fabricating a plurality of ceramic compacts which uses less expensive starting materials and yet permits the use of lower temperatures than do the prior art methods.

SUMMARY OF THE INVENTION

The inventors have discovered that, by using relatively inexpensive $U_3O_8$ in place of uranium dioxide and injecting a reducing gas into the pressing die, they are able to achieve shorter pressing times using lower temperatures and higher pressures than possible with prior art methods.

This can be attained by successively adding accurately weighed increments of $U_3O_8$ powder to a vertical metal carbide die, leveling each increment, inserting a thin metallic spacer between each of said increments, heating to a temperature of 800° to 1,000° C. while pressing at a pressure of from 5,000 to 20,000 psi for a period of about 5 minutes while injecting a reducing gas inside the die, removing the plurality of slightly hyperstoichiometric uranium dioxide plates formed from the die and maintaining them in a reducing or inert atmosphere at a temperature of 800° to 1,000° C. for a period of time sufficient to reduce the hyperstoichiometric uranium dioxide to stoichiometric uranium dioxide.

DESCRIPTION OF A SPECIFIC EMBODIMENT OF THE INVENTION

The hot press apparatus may consist of an induction-heated furnace mounted in a hydraulic press; a graphite resistor furnace can be used. Pressure and power can be regulated manually and the temperature measured by means of an optical pyrometer. The reducing gas which is injected into the die during the pressing step may be either hydrogen or carbon monoxide.

The die-susceptor assembly, punches and spacers are machined from a high-temperature, high-strength metal carbide such as titanium carbide. Liners made of filter paper can be used in the punch and on the spacer faces to reduce sticking. While desirable, the use of liners is not believed to be essential.

It is important that each increment of powder which is added to the die be carefully and accurately leveled off in the die before the spacer is inserted in order to produce fuel plates having a uniform thickness.

Although $U_3O_8$ will give good results in obtaining stoichiometric uranium dioxide plates, any hyperstoichiometric uranium oxide having an oxygen to metal ratio of greater than 2 to 1 can be used with this method.

The hot pressing of the hyperstoichiometric uranium oxide does not result in complete reduction to $UO_{2.00}$ but results in a slightly hyperstoichiometric uranium dioxide of $UO_{2.03\text{-}2.05}$. Reduction is completed by maintaining the hot-pressed plates, after removal from the press, in a reducing or inert atmosphere such as hydrogen or argon at a temperature of 800°–1,000° C. for a period of time sufficient to complete the reduction to $UO_{2.00}$, which is about 2 hours.

The hyperstoichiometric uranium oxide powder may be used alone in order to produce plates of uranium dioxide or it may be mixed with plutonium dioxide to obtain uranium dioxide-plutonium dioxide fuel plates. If the mixed uranium dioxide-plutonium dioxide plates are desired, it is important that homogeneity of the powders by achieved by careful powder preparation before pressing.

The die pressures may vary from 5,000 to 20,000 psi and die temperatures may vary from 800° to 1,000° C. as necessary in order to obtain the desired fuel plate densities.

It will be understood that the invention is not to be limited to the details given herein but that it may be modified within the scope of the appended claims.

The embodiments of the invention in which an exclusive property or privilege is claimed are defined as follows:

1. A method of making a plurality of fuel plates for a nuclear reactor simultaneously comprising successively adding accurately weighed increments of hyperstoichiometric uranium oxide to a metal carbide die which is oriented vertically, leveling the powder, inserting a metal carbide spacer between the increments, thereby charging the die, and compressing the powder to a sufficient extent to permit the addition of another increment after each such incremental addition to charge said die, heating said charge to a temperature of 800° to 1,000° C., compressing the charge at a pressure of 5,000 to 20,000 psi while injecting a reducing gas into said die, maintaining said pressure and temperature for about 5 minutes, thereby forming a plurality of fuel plates of slightly hyperstoichiometric uranium dioxide, discharging said fuel plates from said die and maintaining said fuel plates in a reducing or inert atmosphere at a temperature of 800° to 1,000° C. for a period of time sufficient to reduce the slightly hyperstoichiometric uranium dioxide fuel plates to stoichiometric uranium dioxide.

2. The method of claim 1 wherein the hyperstoichiometric uranium oxide is $U_3O_8$.

3. The method of claim 2 wherein the slightly hyperstoichiometric uranium dioxide fuel plates are maintained in the reducing or inert atmosphere for 2 hours, thereby reducing the plates to uranium dioxide.

4. The method of claim 2 wherein the metal carbide die is titanium carbide.

* * * * *